Figure 1:
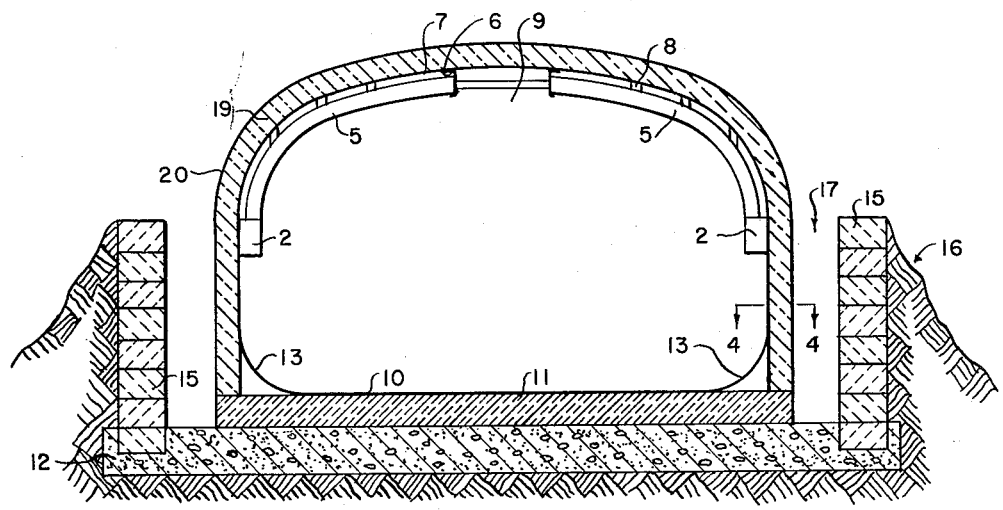

July 31, 1962　　J. C. VAN BERGEN ETAL　　3,047,184
STORAGE TANK
Filed Jan. 15, 1960　　3 Sheets-Sheet 1

INVENTORS:
JOHANNES C. VAN BERGEN
CLEMENT R. J. LAQUEUILLE
SIMON A. BOON
BY: H. D. Birch
THEIR ATTORNEY INVENTORS
JOHANNES C. VAN BERGEN
CLEMENT R. J. LAQUEUILLE
SIMON A. BOON
BY H. D. Birch
THEIR ATTORNEY July 31, 1962   J. C. VAN BERGEN ETAL   3,047,184
STORAGE TANK
Filed Jan. 15, 1960   3 Sheets-Sheet 3
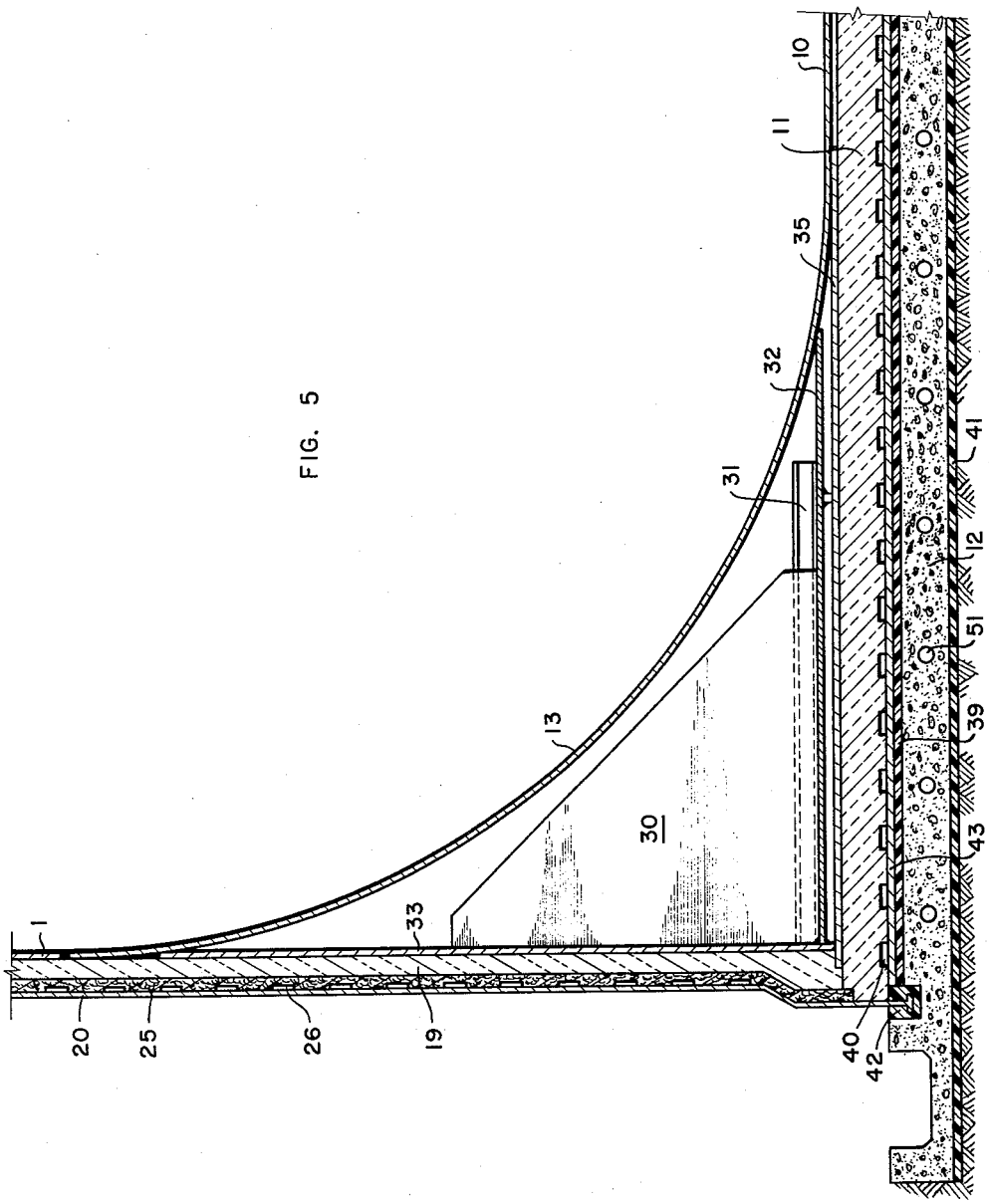
INVENTORS:
JOHANNES C. VAN BERGEN
CLEMENT R. J. LAQUEUILLE
SIMON A. BOON
BY: H. D. Birch
THEIR ATTORNEY 3,047,184
STORAGE TANK
Johannes C. van Bergen, Clement R. J. Laqueuille, and Simon A. Boon, all of The Hague, Netherlands, assignors to Shell Oil Company, a corporation of Delaware
Filed Jan. 15, 1960, Ser. No. 2,741
1 Claim. (Cl. 220—9)

The invention relates to a tank for the storage of volatile liquids, in particular for the storage of methane, propane, butane, butadiene, etc. at approximately atmospheric or at slight superatmospheric pressure, provided with a vertical, cylindrical, metal shell and a heat-insulating covering.

An object of the invention is to provide a tank of the above type which is simple and light in construction.

According to the invention the roof of the tank is built up of a number of curved trusses radially directed towards the vertical center line, the outer ends of the trusses are secured to the inner surface of the cylindrical shell. The trusses are joined together and have their ends secured by a central ring and carry a thin sheeting, in such a way as to form a domed roof, the radius of curvature of the curved trusses continually increasing from the vertical shell to the center of the tank, so that no compressive stresses are set up in the roof sheeting in a transverse direction to the trusses.

The shell and roof of the tank are provided with a heat-insulating covering, thereby reducing as much as possible an influx of heat from outside to the liquid in the tank which has a low temperature, in the case of methane, for example about −160° C., at the pressures contemplated. In order to prevent the ingress of damp air into the covering, which would cause icing and cracks therein, it is advisable to provide the heat-insulating covering with a gas-tight layer.

Tanks are usually secured by means of anchor bolts which connect the bottom to a concrete base plate. Anchor bolts, however, have the drawback firstly that heat leaks into the tank therethrough, and secondly that it is difficult to ensure a good sealing of the insulation around the anchor bolts and consequently to prevent damp air from penetrating into the insulation. In order to overcome this disadvantage the anchor bolts are preferably omitted, and instead the tank is provided with a weighting at the bottom and near the vertical wall. This weighting counterbalances the upward forces exerted in a vertical direction in the vertical tank shell, which forces result from any superatmospheric pressure prevailing in the tank.

By properly selecting the shape of the transition plate from the tank shell to the tank bottom it is possible to effect a considerable reduction in the forces which have to be absorbed by the weighting which may therefore be of decreased dimensions. To this end the weighting is preferably arranged inside a space formed by the vertical tank shell, a horizontal sheet and a curved sheet, which latter is connected to the tank bottom and the vertical wall of the tank or is integral therewith.

The tank may be supported by a concrete base plate which, in order to restrict an influx of heat into the tank, is provided on one or both sides with a heat-insulating lining.

To ensure that the ground beneath the concrete base plate is not cooled off or refrigerated excessively, thereby leading to icing in the ground, channels may be arranged in the concrete plate and/or the heat-insulating lining for passing through a gas, such as air.

Figure 2:
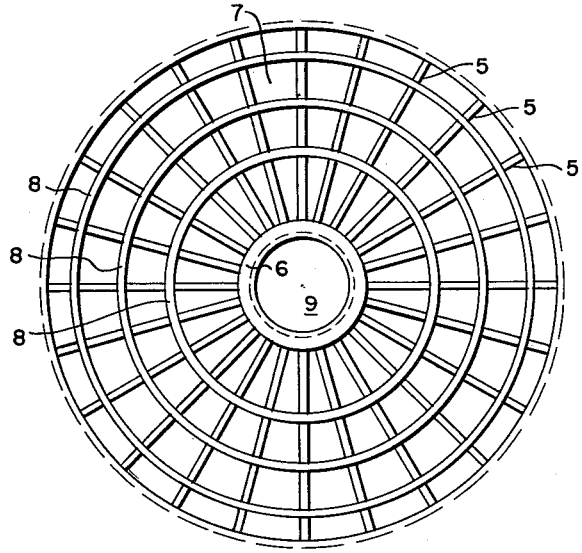
Figures 3, 4:
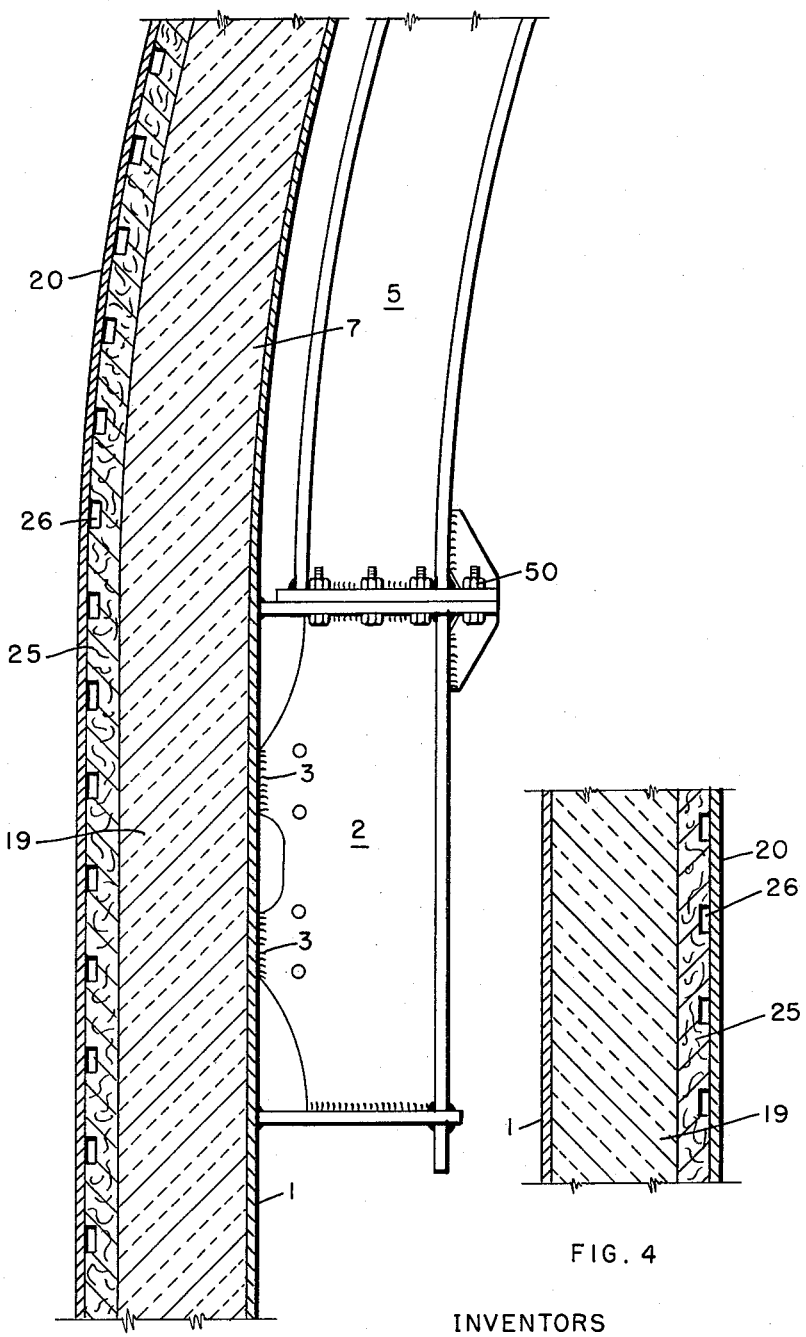

The tank in accordance with the invention will now be further described with reference to the accompanying drawing:

FIG. 1 is a diagram of a cross-section of the tank.
FIG. 2 is a diagram of a top plan view of the tank.
FIG. 3 is a side elevation of the attachment of the support beams to the tank shell.
FIG. 4 is a cross-section of the tank shell taken on the line 4—4 in FIG. 1.
FIG. 5 is a cross-section of the bottom part of the tank.

The tank consists of a vertical cylindrical tank shell 1 made of stainless steel or other suitable type of steel of which the toughness does not decline excessively at the low temperatures prevailing in the tank. Support members 2 are secured to the inside of the tank shell 1, for example by means of the welds 3 (see FIG. 3). Curved trusses 5 are connected to the support members 2 by means of bolts 50. These trusses 5 are interconnected by the cross-beams 8, their ends being connected to a central ring 6. The trusses 5 support thin metal sheets which are welded together, thus constituting the tank roof 7. The trusses have a radius of curvature which continually increases from the truss end near the wall of the tank to the truss end near the center of the tank. The radius of curvature near the tank shell is at least equal to half the radius of the tank and is practically infinite near the center of the tank. This has the advantage that no compressive stresses prevail in a transverse direction to the trusses in the sheets supported by curved beams. Thus there is no chance of the sheets folding so that they may be of a thin design, thereby saving a considerable amount of material and weight.

The central ring 6 forms an opening 9 in the tank roof through which the tank can be filled and emptied. The tank is provided with a bottom 10 which is supported by a compression resistant plate 11 made of heat-insulating material, which plate is in turn supported by a concrete base plate 12.

A surrounding wall 15 is preferably arranged at a short distance from (for example about 20 inches) and round the tank. This wall may be built up of bricks, for example, and the outside thereof surrounded by a wall of earth 16. The advantage of this wall 15 is that in case of fracture of the tank shell 1 the liquid butane, propane, or methane, etc., enters the space 17 and is retained. Owing to the short distance of the wall to the tank there is only a small free liquid surface should the tank shell break. This has the advantage that any fire is readily extinguished. The function of the wall of earth 16 is as follows. Should the tank shell 1 break and the cold liquid from the tank come into contact with the brick wall 15 there is great risk of the wall 15 splitting owing to the sudden change in temperature, as a result of which the liquid would flow away through the openings formed in the wall. The liquid is collected by the earth wall 16, and owing to the low temperature of the liquid moisture present in the earth wall 16 will be turned into ice and prevent the further escape of liquid.

In order to counteract an influx of heat into the tank, the outside thereof is covered with a layer of heat-insulating material 19 (see FIGS. 1, 3, 4 and 5). Suitable materials are, for example, fiber glass, poly-urethane foam, etc. In order to prevent the ingress of moisture into the heat-insulating layer 19 which might lead to icing, it is desirable to provide an air-tight outer sheeting 20. This sheeting may be made of steel, aluminum or other suitable metals.

A layer of rockwool 25 may be attached to the layer 19, which layer of rockwool is provided with channels 26 through which a dry gas, for example, dry air, may be passed. The dry air led through the channels 26 serves to withdraw water vapor which might penetrate through the sheeting 20. It is not essential to make the air circulate through the channels 26; it is also possible to introduce dry air under pressure into the channels 26 or into the insulation itself, thereby preventing moist air from leaking through the sheeting 20.

The pressure in the tank is usually higher than 1 atm. abs. Upwardly directed forces are exerted on the tank roof as a result of the superatmospheric pressure. Normally these forces are absorbed by anchor bolts by which a tank is secured to the foundation.

Anchor bolts, however, have the drawback that heat leaks into a tank through these bolts. Another drawback is that it is difficult to ensure a good moisture seal of the insulation near the anchor bolts. In addition, anchor bolts make it difficult for the tank bottom to expand freely as a result of fluctuations in temperature. In order to overcome the drawbacks attached to anchor bolts a special construction is therefore employed in which no anchor bolts are used.

This construction is shown in FIG. 5. As a result of the gas pressure, upwardly directed forces are exerted on the roof of the tank and in the vertical tank shell 1. The forces exerted in this vertical tank shell are largely absorbed by curved sheets 13 which are connected to or integral with the vertical tank shell 1 and the bottom 10. Owing to the gas pressure in the tank vertical forces are also exerted on these curved sheets 13, but these forces are directed downward.

The rest of the vertical upwardly directed forces in tank shell 1 are absorbed by weights 30 which are supported by plates 32 provided with ribs of beams 31. The ends of the plates 32 are welded to the vertical wall 33 and the latter is in turn connected to the tank shell 1. As stated earlier, the curved sheets 13 are connected to the tank shell 1 and the tank bottom 10 and prevent the liquid from reaching the weights 30. Plates 35 support the vertical wall 33. The plates 35 are free to expand and shrink as they are not welded to the structure. The tank shell 1 and the wall 33 are covered with a layer of heat-insulating material 19, for example, fiber glass or poly-urethane foam. As above-stated, an outer sheeting 20 serves to prevent as much as possible the ingress of moist air into the layer 19. A compression-resistant heat-insulating layer 11, for example, consisting of foam glass, supports the tank bottom 10 and the plate 35.

Below the heat-insulating layer 11 is a steel plate 43 which serves to prevent water vapor from penetrating into the insulation layer 11. A bitumen layer 39 is arranged below this steel plate 43. The whole is supported by a concrete foundation block 12. A bitumen layer 41 is preferably provided below this foundation block 12.

The lower edge of the sheeting 20 is inserted in a recess 42 in the concrete foundation block 12. The recess 42 is filled with bitumen so as to provide an airtight seal. The heat-insulating layer 11 is provided with channels 40 for the circulation of a dry gas, for example, air with the object of preventing water vapor passed through a leak in the vapor-tight lining from penetrating into the insulation and there causing icing. The concrete block 12 may also be provided with passages 51 for the circulation of a relatively warm gas, such as air, or a relatively warm liquid. This prevents cold from penetrating the ground and causing icing in the ground, with the result that the tank foundation freezes up.

The tank described is particularly adapted for the storage of liquefied gases at about atmospheric pressure or a pressure slightly above atmospheric pressure, in particular for the storage of liquid methane, ethane, propane, butadiene, etc.

We claim as our invention:

A tank construction for the storage of liquefied petroleum gases at approximately atmospheric pressure and at substantially subatmospheric temperatures comprising:
(a) a vertical cylindrical metal shell;
(b) a sheet metal domed roof mounted on said shell;
(c) a plurality of curved trusses radially directed from the vertical axis of the cylindrical metal shell supporting said roof;
(d) a plurality of concentric ring members joining said trusses together;
(e) the innermost ends of said trusses terminating at the innermost of said ring members;
(f) the outermost ends of said trusses terminating at the upper end of said vertical cylindrical metal shell;
(g) a round dished metal tank bottom;
(h) the peripheral edge of said dished tank bottom joining said vertical cylindrical shell at a point above the lower end of said vertical cylindrical shell;
(i) solid weighting elements located in the peripheral space between the lower portion of the vertical cylindrical shell and the curved portion of said dished metal tank bottom; and
(j) a heat-insulating gas-tight covering enclosing the entire metal tank unit.

References Cited in the file of this patent
UNITED STATES PATENTS

| | | |
|---|---|---|
| 1,622,787 | Horton | Mar. 29, 1927 |
| 2,045,478 | Kuehn | June 23, 1936 |
| 2,241,843 | Buddrus et al. | May 13, 1941 |
| 2,297,002 | Larson | Sept. 29, 1942 |
| 2,313,997 | Jackson | Mar. 16, 1943 |
| 2,315,453 | Pittman | Mar. 30, 1943 |
| 2,332,227 | Jackson | Oct. 19, 1943 |
| 2,349,096 | Jackson | May 16, 1944 |
| 2,520,883 | Kornemann et al. | Aug. 29, 1950 |
| 2,562,601 | Caquot et al. | July 31, 1951 |
| 2,690,185 | Pomykala | Sept. 28, 1954 |
| 2,768,432 | Hines | Oct. 30, 1956 |

FOREIGN PATENTS

| | | |
|---|---|---|
| 545,352 | Belgium | Mar. 15, 1956 |
| 993,903 | France | Aug. 3, 1951 |